United States Patent
Fawcett

(10) Patent No.: US 7,347,436 B1
(45) Date of Patent: Mar. 25, 2008

(54) WHEEL SUSPENSION SYSTEM, AND VEHICLE INCLUDING SAME

(76) Inventor: Edward C. Fawcett, 27490 Norwood St., Highland, CA (US) 92346

( * ) Notice: Subject to any disclaimer, the term of this patent is extended or adjusted under 35 U.S.C. 154(b) by 388 days.

(21) Appl. No.: 11/025,516

(22) Filed: Dec. 29, 2004

(51) Int. Cl.
*B60G 3/01* (2006.01)

(52) U.S. Cl. .................... 280/124.127; 280/124.154

(58) Field of Classification Search ......... 280/124.127, 280/124.17, 124.175, 124.154, 6.151, 6.153; 267/52
See application file for complete search history.

(56) References Cited

U.S. PATENT DOCUMENTS

| | | | | |
|---|---|---|---|---|
| 879,160 | A | * | 2/1908 | Fulton ................... 180/363 |
| 2,310,821 | A | * | 2/1943 | Wimbish ............. 280/124.127 |
| 2,831,699 | A | * | 4/1958 | Holmes ................ 280/80.1 |
| 2,888,268 | A | * | 5/1959 | Fellabaum ............ 280/684 |
| 3,621,739 | A | * | 11/1971 | Seablom ............... 81/59.1 |
| 3,927,900 | A | * | 12/1975 | Wischmeier ........ 280/124.127 |
| 4,077,643 | A | | 3/1978 | Bates ................... 280/43.18 |
| 4,154,352 | A | | 5/1979 | Fowler ................. 414/495 |
| 4,673,328 | A | | 6/1987 | Shiels .................. 414/471 |
| 4,685,855 | A | | 8/1987 | Celli .................... 414/482 |
| 4,789,181 | A | * | 12/1988 | Baxter ................. 280/681 |
| 5,474,416 | A | | 12/1995 | Rogge et al. ........ 419/482 |
| 5,536,131 | A | | 7/1996 | Behr .................... 414/495 |
| 5,765,859 | A | | 6/1998 | Nowell et al. ....... 280/704 |
| 5,810,544 | A | | 9/1998 | Wellman ............. 414/495 |
| 6,142,496 | A | | 11/2000 | Bartel ............. 280/124.166 |
| 6,273,435 | B1 | | 8/2001 | Stringer .............. 280/6.151 |

OTHER PUBLICATIONS

Flyer by Direct Edge Inc. Dec. 2, 2004.

* cited by examiner

*Primary Examiner*—Paul N. Dickson
*Assistant Examiner*—Joseph Rocca
(74) *Attorney, Agent, or Firm*—Eric Karich

(57) ABSTRACT

A suspension system for a wheel has an elongate post member, a wheel mount adapted for mounting the wheel, an axle for rotatably mounting the wheel mount on the elongate post member, a frame adapted to slidably receive the post member such that the post member slides between a first position and a second position, and a resilient member adapted to bias the post member toward the first position.

17 Claims, 5 Drawing Sheets

WHEEL SUSPENSION SYSTEM, AND VEHICLE INCLUDING SAME

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to suspensions of trailers, and more particularly to a suspension system for a trailer that has a bed that can be lowered to the ground.

2. Description of Related Art

Utility trailers are commonly coupled behind self-propelled vehicles and used to haul bulky and/or heavy objects. A typical trailer includes a frame supported on wheels and a platform called a "bed" on which a load is placed. Some trailers include ramps for loading and unloading cargo. Other trailers are designed to be tipped to facilitate loading and unloading.

Trailers are also known that have beds that can be lowered to the ground. An example of such a trailer is disclosed in Stringer, U.S. Pat. No. 6,273,435, which teaches a trailer that includes a bed that is attached to the frame with a hydraulic slider that functions to raise and lower the bed.

Behr, U.S. Pat. No. 5,536,131, teaches a utility trailer that includes a bed that is pivotally attached to a frame of the trailer. A hand winch is used to manually raise and lower the bed in a generally vertical direction.

Shiels, U.S. Pat. No. 4,673,328, teaches a trailer with a lift/tilt-bed. The trailer includes four pivotal tracks that function to guide the bed from the lowered to the raised position.

Various other prior art references teach similar trailers, including Bartel, U.S. Pat. No. 6,142,496, Wellman, U.S. Pat. No. 5,810,544, Nowell et al., U.S. Pat. No. 5,765,859, Rogge et al., U.S. Pat. No. 5,474,416, Celli, U.S. Pat. No. 4,685,855, and Fowler, U.S. Pat. No. 4,154,352.

The above-described patents are hereby incorporated by reference in full.

In many wheeled vehicles, each wheel is suspended via a suspension system that dampens roughness of a surface under the wheel as the wheel moves over the surface. In general, a trailer is a vehicle adapted to be pulled (i.e., towed) behind a self-propelled vehicle. Known suspension systems for trailers include spring-mounted axles. In a typical trailer with a spring-mounted axle, the axle extends between opposite sides of the trailer and passes under a bed of the trailer. Located under the bed, the axle prevents the bed from being lowered to the ground.

It would be beneficial to have a suspension system for a wheel of a vehicle that does not extend under the vehicle. Such a suspension system would allow, for example, the construction of a trailer having a bed that can be lowered to the ground to facilitate loading objects on the bed and unloading objects from the bed.

SUMMARY OF THE INVENTION

A suspension system for a wheel is disclosed including an elongate post member, a wheel mount adapted for mounting the wheel, an axle for rotatably mounting the wheel mount on the elongate post member, a frame adapted to slidably receive the post member such that the post member slides between a first position and a second position, and a resilient member adapted to bias the post member toward the first position. A vehicle is described including the suspension system.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
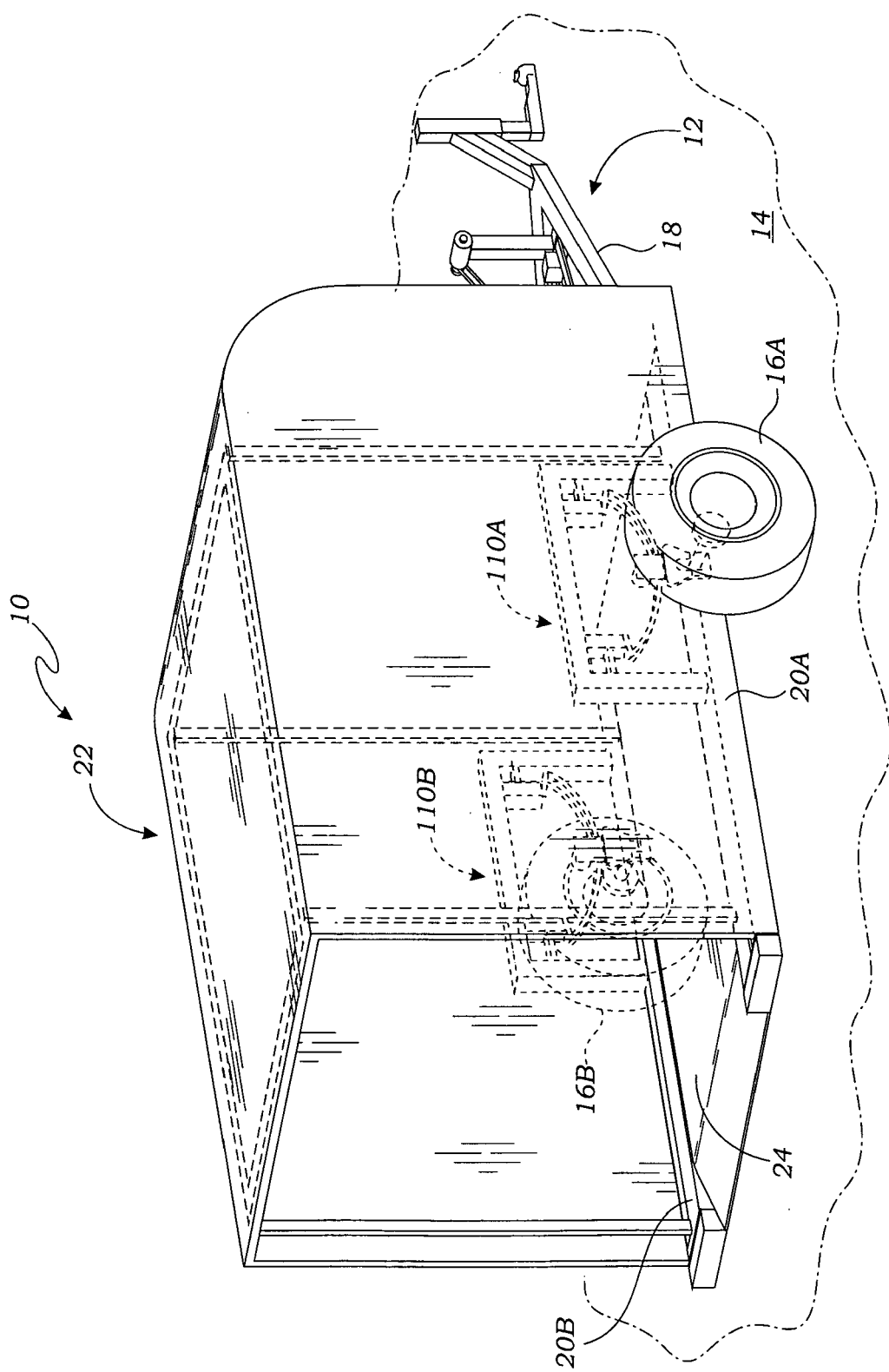
FIG. 1 is a perspective view of one embodiment of a trailer including a pair of wheels suspended from a frame via novel wheel suspension systems.

FIG. 1 is a perspective view of one embodiment of a trailer 10 including a pair of wheels 16A and 16B suspended from a frame 12 via respective novel wheel suspension systems 110A and 110B. In the embodiment of FIG. 1, the frame 12 is supported above a surface 14 by the pair of wheels 16A and 16B. In general, the wheels 16A and 16B support the frame 12 above the surface 14, and allow the trailer 10 to be moved along the surface 14. The frame 12 includes a tongue portion 18, a pair of spaced apart elongate frame arms 20A and 20B, and an upper portion 22 positioned above the frame arms 20A and 20B. A bed 24 is positioned between the frame arms 20A and 20B.

The wheel 16A is coupled to the frame arm 20A via the suspension system 110A, and the wheel 16B is coupled to the frame arm 20B via the suspension system 110B. As described in more detail below, the suspensions systems 110A and 110B advantageously include stub axles such that an area under the bed 24 is free from any component of the trailer 10. This advantageously allows the bed 24 to be lowered to the surface 14.

It is noted that the suspension systems 110A and 110B may be used to couple wheels to frames of other types of vehicles. That is, the trailer 10 of FIG. 1 is generally representative of any number of wheeled vehicles, and the frame 12 is generally representative of a frame of a wheeled vehicle.

Figure 2:
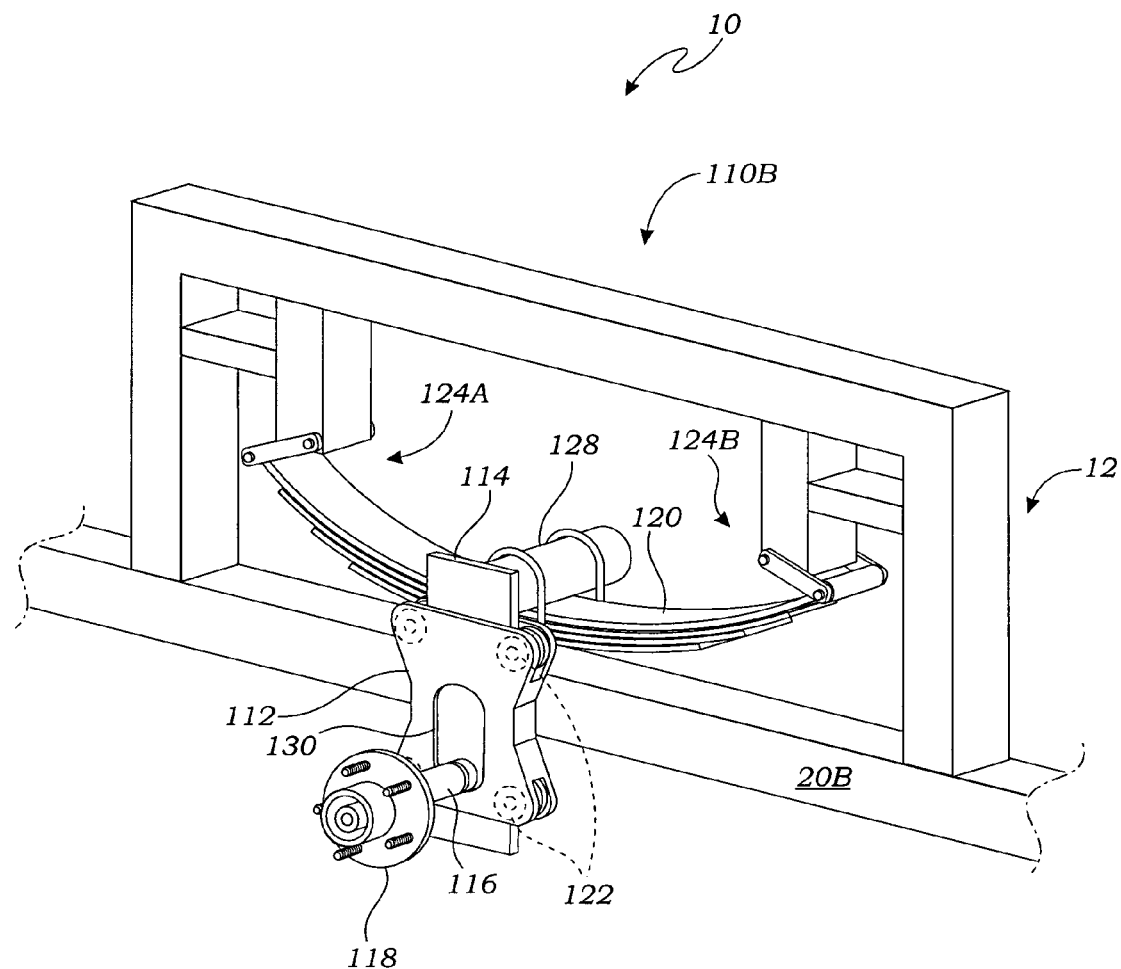
FIG. 2 is a perspective view of a suspension system used to mount one of the wheels of the trailer.

FIG. 2 is a perspective view of the suspension system 110B of the trailer 10 of FIG. 1 illustrating the suspension system 110B used to mount the left wheel 16B to the frame arm 20B of the frame 12 of the trailer 10. The suspension system 110A used to mount the right wheel 16A to the frame arm 20A of the frame 12 of the trailer 10 is similar to the suspension system 110B.

In the embodiment of FIG. 2, the suspension system 110B includes a frame 112, a post member 114, an axle 116, a wheel hub 118, and a resilient member or spring 120, such as a leaf spring. In general, the frame 112 is adapted to be mounted to the frame arm 20B of the trailer 10, and to receive the post member 114. When the suspension system 110B is assembled, the frame 112 supports the post member 114 such that the post member 114 can move within the frame 112. In this embodiment, the frame 112 is rigidly attached to the frame arm 20B of the frame 12 of the trailer 10 and oriented substantially vertically. The frame 112 supports the post member 114 such that the post member 114 can move (i.e., slide) up and down vertically within the frame 112.

The post member 114 has an axle 116 extending outwardly from one side, and a spring mount 128 also extending outwardly, in this embodiment from an opposite side. The axle 116 rotatably mounts the wheel hub 118 on the post member 114. The wheel hub 118 has lug bolts or similar features extending outwardly for mounting the wheel 16B.

The post member 114 is shown in a first (i.e., lowered) position within the frame 112 of the suspension system 10B. In general, the spring 120 or resilient member is adapted to bias the post member 114 toward the first position. The spring 120 is coupled to an upper end of the post member 114 and opposes upward movement of the post member 114 within the frame 112. In FIG. 2 the leaf spring 120 has two ends attached to the frame 12 of the trailer 10. One end is attached via a pair of shackle plates 124A, and the other end is attached via another pair of shackle plates 124B. A central portion of the leaf spring 120 is attached to the spring mount 128 of the post member 114 via a pair of "U"-shaped bolts or similar attachment elements.

While one embodiment of the spring is shown, those skilled in the art will recognize that many different forms of spring or resilient member could be adapted to the present suspension system 110B, and such alternatives should be considered within the scope of the term "resilient member" or "spring" as used in the presently claimed invention.

The frame 112 may include at least one bearing member positioned within the frame 112 to is slidably receive the post member 114. In the embodiment of FIG. 2, the frame 112 has four rollers 122 each positioned at opposite sides of an upper end and a lower end of the frame 112. Each of the rollers 122 has a groove in an outer surface adapted to receive an outer surface of the post member 114. When the post member 114 is installed in the center opening of the frame 112 as shown in FIG. 2, the rollers 122 contact surfaces (i.e., side surfaces) of the post member 114. Other methods of slidably mounting the post member 114 within the frame 112 via at least one bearing member are also possible. Other forms of bearings known to those skilled in the art could also be utilized, and should be considered within the scope of the present invention.

In the embodiment of FIG. 2, the frame 112 has a slot 130 to receive the axle 116 of the post member 114. The slot 130 extends from an upper end of the frame 112 into a center section of the frame 112. The axle 116 extends through the slot 130, and the axle 116 moves in the slot 130 as the post member 114 moves within the frame 112.

When the left wheel 16B of the trailer 10 is mounted to the wheel hub 118, a left side of the frame 12 of the trailer 10 is supported above the surface 14 (FIG. 1) by the suspension system 110B, and the left wheel 16B is operatively positioned for rotary motion beneath the frame 12 of the trailer 10. As the trailer 10 is moved along the surface 14, the leaf spring 120 allows the left wheel 16B and the post member 114 to move relative to the frame 12 of the trailer 10, reducing transmission of any roughness of the surface 14 to the frame 12 of the trailer 10.

Figure 3:
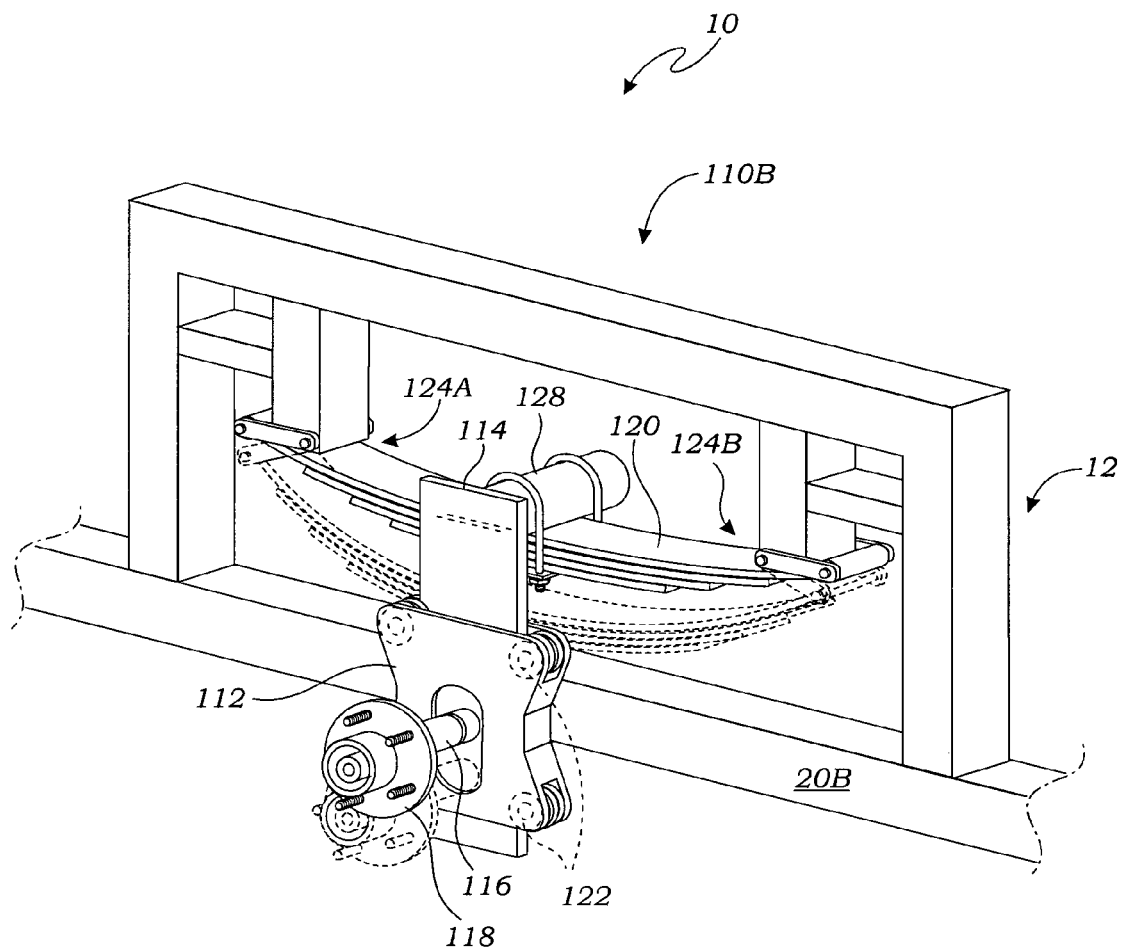
FIG. 3 is a perspective view thereof illustrating the movement of the suspension system when the trailer hits a bump.

FIG. 3 is a perspective view of the suspension system 110B, illustrating the movement of the suspension system 110B from the first position to the second position. As the wheel hub 118 moves upwardly, the post member 114 moves upwardly within the frame 112 against the bias of the spring 120. The bias of the spring 120 eventually forces the wheel hub 118 back to the first position.

Figure 4:
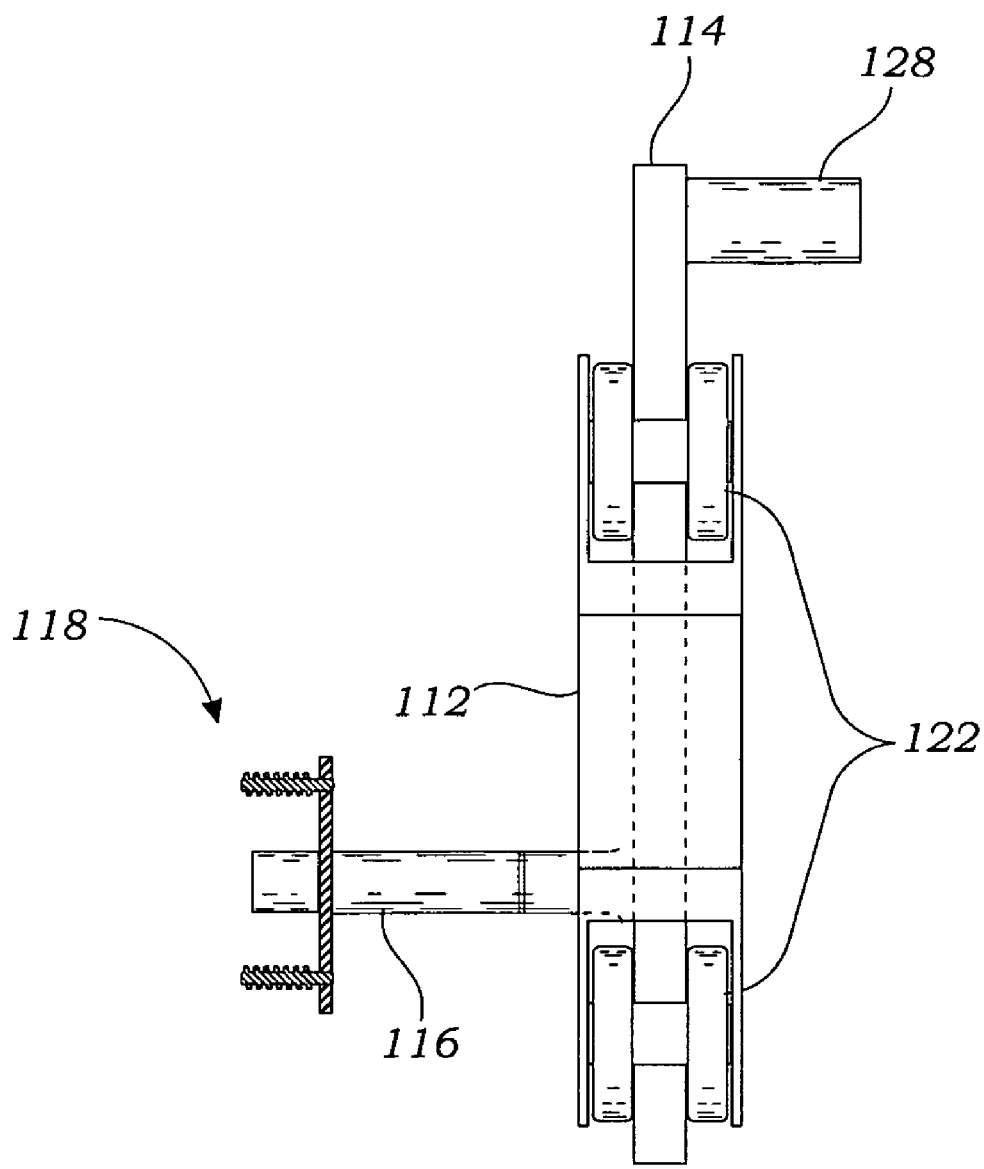
FIG. 4 is a side elevational view of the suspension system.

FIG. 4 is a side view of the suspension system 110B of FIG. 2 wherein the post member 114 is in the first position within the frame 112.

Figure 5:
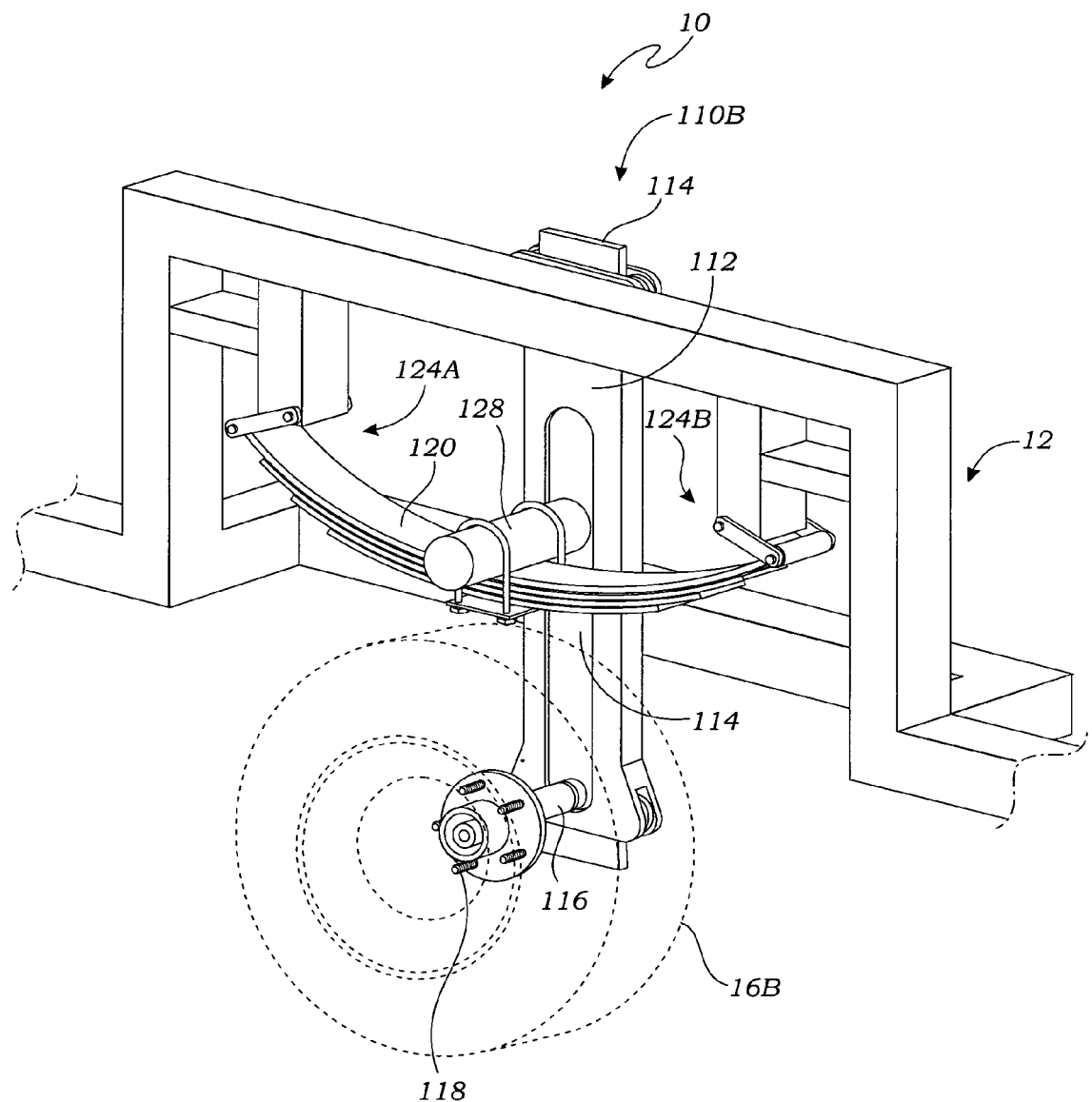
FIG. 5 is a perspective view of an alternative embodiment of the suspension system.

FIG. 5 is a perspective view of an alternative embodiment of the suspension system 110B. In this embodiment, the frame 112 is attached to the trailer 10 so that the wheel 16B is positioned under the frame. In this embodiment, the spring mount 128 is on the same side as the axle 116.

Many other superficial changes can be made to the suspension system 110B by those skilled in the art without altering the fundamental design of the present invention. For example, the springs 120 could be inverted, the frame 112 could be attached in a different manner, and many other changes. Such alterations should be considered within the scope of the present invention.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A suspension system for a wheel, comprising:
   an elongate post member;
   a wheel mount adapted for mounting the wheel;
   an axle for rotatably mounting the wheel mount on the elongate post member;
   a frame adapted to slidably receive the post member such that the post member slides between a first position and a second position;
   a resilient member adapted to bias the post member toward the first position;
   wherein the frame comprises four bearing members positioned within the frame and adapted to slidably receive the post member; and
   wherein the four bearing members are each positioned at opposite sides of two ends of the frame.

2. The suspension system as recited in claim 1, wherein in assembly the post member is positioned within the frame and can move within the frame.

3. The suspension system as recited in claim 2, wherein in assembly the frame supports the post member such that the post member can move within the frame in either one of two opposing directions.

4. The suspension system as recited in claim 3, wherein in assembly the resilient member opposes movement of the post member within the frame in one of two directions.

5. The suspension system as recited in claim 2, wherein in assembly the frame supports the post member such that the post member can move within the frame in either an upward direction or an opposite downward direction.

6. The suspension system as recited in claim 1, wherein the frame comprises at least one bearing member positioned within the frame and adapted to slidably receive the post member.

7. The suspension system as recited in claim 1, wherein the axle comprises a stub axle.

8. The suspension system as recited in claim 1, wherein the wheel mount comprises a wheel hub, and wherein the axle comprises a spindle adapted to receive the wheel hub.

9. The suspension system as recited in claim 1, wherein the frame comprises a slot, and wherein in assembly the axle extends through the slot.

10. The suspension system as recited in claim 9, wherein the slot extends from an end of the fame into a center section of the frame.

11. The suspension system as recited in claim 10, further comprising a plate adapted to be positioned over a portion of the slot adjacent the end of the frame when the post member is positioned within the frame.

12. The suspension system as recited in claim 1, wherein in assembly the frame is oriented substantially vertically and the resilient member is coupled to an uppermost one of the two ends of the post member.

13. The suspension system as recited in claim 1, wherein the resilient member comprises a leaf spring.

14. The suspension system as recited in claim 1, wherein each of the bearing members comprises a roller.

15. The suspension system as recited in claim 14, wherein each of the rollers comprises a groove in an outer surface adapted to receive an outer surface of the post member.

16. A suspension system for a wheel, comprising:
a vehicle frame;
an elongate post member;
a wheel mount adapted for mounting the wheel;
an axle for rotatably mounting the wheel mount on the elongate post member;
a frame adapted to slidably receive the post member such that the post member slides between a first position and a second position, the frame being fixedly mounted on the vehicle frame such that the wheel is operatively positioned for rotary motion beneath the vehicle frame;
a resilient member adapted to bias the post member toward the first position;
wherein the frame comprises four bearing members positioned within the frame and adapted to slidably receive the post member; and
wherein the four bearing members are each positioned at opposite sides of two ends of the frame.

17. A suspension system for a wheel, comprising:
an elongate post member;
a wheel mount adapted for mounting the wheel;
an axle for rotatably mounting the wheel mount on the elongate post member;
a frame adapted to slidably receive the post member such that the post member slides between a first position and a second position;
a resilient member adapted to bias the post member toward the first position;
wherein the frame comprises a plurality of bearing members positioned within the frame and adapted to slidably receive the post member; and
wherein each of the bearing members comprises a roller.

* * * * *